(12) United States Patent
Baruvoori et al.

(10) Patent No.: US 11,023,895 B2
(45) Date of Patent: Jun. 1, 2021

(54) AUTOMATED REVIEW SYSTEM FOR TRANSACTIONS

(71) Applicant: Visa International Service Association, San Francisco, CA (US)

(72) Inventors: Rama Krishna Baruvoori, Dublin, CA (US); Pranali Brahmankar, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 16/421,245

(22) Filed: May 23, 2019

(65) Prior Publication Data

US 2020/0372510 A1    Nov. 26, 2020

(51) Int. Cl.
*G06Q 20/40*    (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS

| | | | |
|---|---|---|---|
| 9,852,476 B2 | 12/2017 | Siddens | |
| 10,069,831 B2 | 9/2018 | O'Connell | |
| 10,229,370 B1* | 3/2019 | Merritt | G06N 20/20 |
| 2012/0311684 A1* | 12/2012 | Paulsen | G06F 21/44 726/6 |
| 2014/0075464 A1* | 3/2014 | McCrea | H04L 67/22 725/14 |
| 2014/0089192 A1 | 3/2014 | Boding | |
| 2016/0019547 A1* | 1/2016 | Gurnani | G06Q 20/40145 705/44 |
| 2018/0103038 A1 | 4/2018 | Burke | |
| 2018/0211022 A1* | 7/2018 | Wagner | G06F 21/34 |
| 2018/0337926 A1 | 11/2018 | O'Connell | |
| 2019/0034949 A1* | 1/2019 | Wellisch | G06Q 30/0235 |
| 2019/0065832 A1* | 2/2019 | Ratnakaram | G06K 9/00275 |
| 2019/0132306 A1* | 5/2019 | Avni | G06Q 20/40 |

* cited by examiner

*Primary Examiner* — Scott C Anderson
(74) *Attorney, Agent, or Firm* — Kilpatrick Townsend & Stockton LLP

(57) ABSTRACT

Techniques for reviewing transaction information are provided. A reviewer computer can review transactions that are marked for review by a resource provider. The reviewer computer can review the transaction based on user information obtained from third party servers. The reviewer computer can also review the transaction based on historical transaction information obtained from a history database. The reviewer computer can aggregated the user information and the historical transaction information in order to generated a consolidated view.

18 Claims, 15 Drawing Sheets

```
//class Transaction
//properties - name, email, creditCard, billingAddress, shippingAddress,deviceFingerPrint, ipAddress //class HistoryObject
--properties of this class - nameMatch, emailMatch, creditCardMatch, billingAddressMatch, shippingAddressMatch,
deviceFingerPrintMatch, ipAddressMatch, status, earliestDate, latestDate Map<HistoryObject> getHistoryData (Transaction input)
Check for all the parameters and generate the query as applicable (Select transaction_id, name, email, credit_card, billing_address,
shipping_address, device_finger_print, ipaddress, created_date, status (active / Rejected) from history_table where
name=input.getName or
Email=input.getEmail or account_Number = input.getAccountNumber)
Retrieve all the records
Loop through the records and count the number of matching combination
Maintain the Hashtable for the below combinations Map<HistoryObject, Integer> historyOutput = new HashMap<>();
historyOutput.add(new HistoryObject(<NameMatch,EmailMatch,ShippingAddressMatch,AccountNumberMatch,Accept>),<count>);
historyOutput.add(new HistoryObject(<NameMatch,EmailMatch,ShippingAddressMatch,AccountNumberMatch,Reject>),<count>);
//get all the combinations that will be required in the UI
```

| Accept Transaction | | | | | | | | | |
|---|---|---|---|---|---|---|---|---|---|
| History - match | | | | | | | Accept | | |
| Name | Email Address | Billing Address | Shipping Address | Credit card | Device fingerprint | IP | Count | Earliest Date | Latest Date |
| ✓ | ✓ | | ✓ | ✓ | | | 5 | 90 days back | 2 days back |
| ✓ | ✓ | | ✓ | | ✓ | | 2 | 91 days back | 15 days back |
| ✓ | ✓ | | ✓ | ✓ | | ✓ | 4 | 92 days back | 20 days back |
| ✓ | ✓ | | | | | ✓ | 3 | 93 days back | 50 days back |
| ✓ | | ✓ | ✓ | ✓ | | | 1 | 60 days back | 60 days back |
| ✓ | | ✓ | | ✓ | | ✓ | 3 | 95 days back | 2 days back |
| ✓ | | ✓ | | ✓ | ✓ | | 2 | 120 days back | 5 days back |
| ✓ | ✓ | | | | ✓ | | 3 | 97 days back | 90 days back |
| ✓ | ✓ | | ✓ | | | | 4 | 98 days back | 10 days back |
| ✓ | ✓ | | | | | | 5 | 99 days back | 11 days back |

FIG. 10A

| User Information | |
|---|---|
| Email owner matched with person on | Yes |
| Email Created Date | 2 years back |
| Billing address to Name Match | Yes |
| Shipping Address to Shipping Name Match | Yes |
| Billing Phone to Name Match | Yes |
| Shipping Phone to Name Match | Yes |
| IP Risky Proxy | No |

| Reject Transaction | | | | | | | | | | |
|---|---|---|---|---|---|---|---|---|---|---|
| History - match | | | | | | | | Reject | | |
| Name | Email Address | Billing Address | Shipping Address | Credit card | Device fingerprint | IP | Count | Earliest Date | Latest Date |
| ✓ | ✓ |  | ✓ | ✓ |  |  | 2 | 5 days back | 3 days back |
| ✓ | ✓ |  | ✓ |  | ✓ | ✓ |  |  |  |
| ✓ | ✓ |  | ✓ | ✓ |  |  |  |  |  |
| ✓ |  |  | ✓ | ✓ |  | ✓ | 4 | 2 days back | Today |
| ✓ |  | ✓ |  | ✓ |  |  |  |  |  |
| ✓ |  | ✓ |  | ✓ |  | ✓ |  |  |  |
| ✓ |  | ✓ |  |  | ✓ |  |  |  |  |
| ✓ | ✓ |  |  |  | ✓ |  |  |  |  |
|  | ✓ |  | ✓ |  |  |  |  |  |  |
| ✓ | ✓ |  |  |  |  |  | 1 | 6 months back | 2 days back |

FIG. 11A

AUTOMATED REVIEW SYSTEM FOR TRANSACTIONS

BACKGROUND

A user, such as a customer, may conduct a transaction with a resource provider. However, before accepting or declining the transaction, the resource provider may want to evaluate the transaction and verify that the transaction is not fraudulent.

The resource provider may enroll in a fraud detection program which reviews transactions in order to assist the resource provider in determining whether to accept or decline the transaction. If a transaction is identified as a transaction for review, then a reviewer for the resource provider can manually review the transaction and determine whether the transaction should be accepted or declined. The reviewer can be, for example, an employee of a request processor.

In order to evaluate the transaction, the reviewer can obtain information about the user making the transaction based on the transaction data. The reviewer can gather data in order to confirm the identity of the user. The reviewer can also gather transaction history data associated with data from the transaction. After reviewing the obtained information, the reviewer can come to a decision as to whether or not transaction should be accepted or declined.

However, the reviewer has to manually identify possible sources of information regarding the customer and their transaction history, and then gather the information. The reviewer will then have to review all of the information and come to a decision based on the obtained information. The gathering of the data can be a very tedious and time consuming process.

Further, it can take a long time for the reviewer to make a decision since the reviewer will have to manually gather and organize the information from the various sources of information. This can also result in human error since the reviewer may not have obtained all of the available information regarding the customer or the reviewer may not have reviewed the information correctly.

Embodiments of the disclosure address these and other problems, individually and collectively.

BRIEF SUMMARY

Example embodiments provide techniques for verifying whether a transaction should be accepted or declined. Specifically, example embodiments provide systems and methods for quickly and accurately reviewing transactions in order to perform fraud management.

An example embodiment provides a method for determining information about a customer and generating a consolidated view of the information. All of the information needed to determine whether to accept or decline a transaction can be provided in a single consolidated view generated by a reviewer computer. The consolidated view can include personal information regarding the customer (e.g., name, email address, billing address, shipping address, credit card information, device fingerprint information, IP address, etc.) based on the customer's history of associated transactions.

The consolidated view can be generated automatically by a request processing system. The consolidated view can be provided to a reviewer, and the reviewer can make a decision as to whether the customer information is correct and the customer information can be verified. Verification of the customer information can be used to determine whether the transaction should be accepted or declined.

Alternatively, the a reviewer computer of the request processing system can review the information that is used for generating the consolidated view and can generate a score. The score can indicate the likelihood that the customer information can be verified. Based on the score, the reviewer computer can then determine whether the transaction should be authorized. The reviewer computer can notify the resource provider computer to accept or decline the transaction.

Other embodiments are directed to systems, devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which:

FIG. 9 is an example of pseudocode for get commands, in accordance with some example embodiments.

FIG. 10A illustrates a consolidated view of an accepted transaction, and FIG. 10B illustrates a consolidated view of user information corresponding to the accepted transaction, in accordance with some example embodiments.

FIG. 11A illustrates a consolidated view of a rejected transaction.

TERMS

Figure 1:
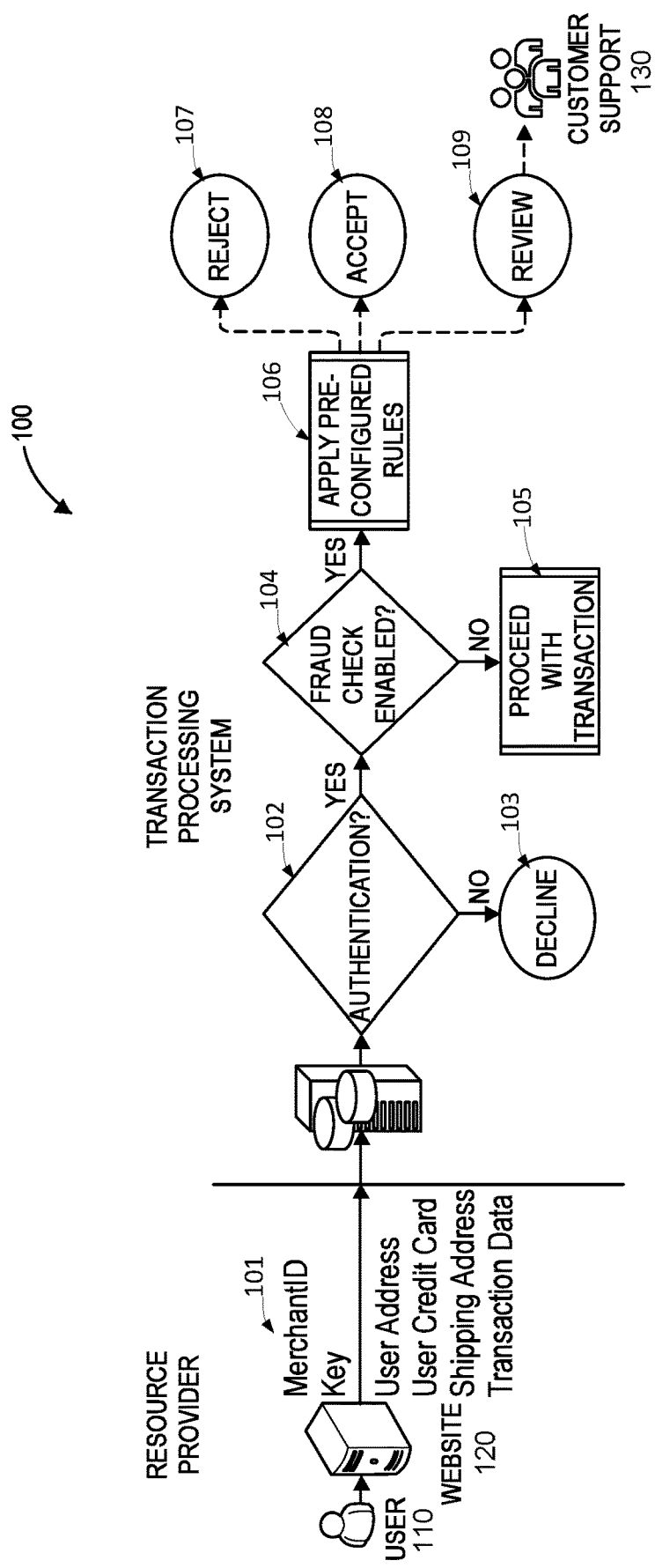
FIG. 1 illustrates a method for reviewing transactions.

Prior to discussing the details of some embodiments of the present disclosure, description of some terms may be helpful in understanding the various embodiments.

An "access device" may be any suitable device that provides access to a remote system. An access device may also be used for communicating with a resource provider computer, an authorizing computer, or any other suitable system. An access device may generally be located in any suitable location, such as at the location of a resource provider or merchant. An access device may be in any suitable form. Some examples of access devices include POS or point of sale devices (e.g., POS terminals), cellular phones, PDAs, personal computers (PCs), table PCs, handheld specialized readers, set-top boxes, electronic cash registers (ECRs), automated teller machines (ATMs), virtual cash registers (VCRs), kiosks, security systems, access systems, terminals, and the like. An access device may use any suitable contact or contactless mode of operation to send or receive data from, or associated with, a user communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. Other examples of access devices include devices (e.g., locks, gates, access control boxes, etc.,) that control physical access to locations (e.g., venues, transit stations, homes, offices, buildings, etc.,) as well as software devices that control access to data or information. In embodiments, the access device may be configured to charge or recharge a user device via contact or contactless modes of operation.

The term "access request" generally refers to a request to access a resource. The access request may be received from a requesting computer, a user device, or a resource computer, for example. The access request may include authorization information, such as a user name, account number, or password. The access request may also include and access request parameters, such as an access request identifier, a resource identifier, a timestamp, a date, a device or computer identifier, a geo-location, or any other suitable information.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may be involved by an access request parameter based on the parameter having a specific parameter value, based on the parameter value being within a certain range, based on the parameter value being above or below a threshold, or any combination thereof.

An "access rule outcome" of an access rule may represent an outcome determined by that rule based on one or more conditions of the rule and the parameters of the access request. For example, an access rule may provide an access rule outcome of either "reject," "accept," or "review," when its conditions are involved by an access request.

The term "access request outcome" may include any determination of whether to grant access to the resource. The access request outcomes may include "accept," "reject," or "review." In some embodiments, an access request outcome for an access request may be "reject" if any of the access rules have an access rule outcome of "reject." In some embodiments, an access request outcome for an access request may be "accept" if any of the access rules have an access rule outcome of "accept," regardless of any outcome being "reject." An access request outcome of "accept" may cause the access request to be granted. An access request outcome of "reject" may cause the access request to be denied. The "review" outcome may initiate a review process for the access request. In various embodiments, other outcomes or other meanings of these outcomes may be used.

An "acquiring entity" can be an entity that can come into possession of something. An acquiring entity may be a business entity (e.g., a commercial bank) that has a business relationship with a particular resource provider, merchant, or other entity. An acquiring entity may operate an acquiring entity computer, which may be referred to as a "transport computer."

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

The term "authentication component" may include a software component or hardware component that can analyze data. In some embodiments, the authentication component may be integrated into a user device and configured for risk evaluation or risk determination for a transaction or interaction of the user device. In embodiments, the authentication component receives or obtain data such as time units from a clock component, time information from an access device, maintains time stamp information, and one or more time limit policies for determining an authentication plan for a given transaction or interaction. In embodiments, the authentication component may convert the time units from the clock component to time information which may be used to determine the authentication plan. In order to implement the authentication plan the authentication component may instruct communication with an access device or authorizing computer.

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer." Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity. In embodiments, the authorization computer may maintain a trusted clock for providing the time stamp information to user devices during manufacture or during personalization with a user.

The term "consumer" may refer to an individual or entity. The consumer may be associated with a financial account and with a user account with a resource provider. The consumer's financial account can be used to conduct financial transactions with the resource provider. In embodiments, the consumer conducts non-transaction related interactions with the resource provider. The consumer may be an individual attempting to conduct fraudulent activity by interacting with a resource provider using fraudulent or stolen authentication data. The term "user" may be used interchangeably with "consumer."

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "providing" may include sending, transmitting, making available on a web page, for downloading, through an application, displaying or rendering, or any other suitable method. In various embodiments of the invention, rule profiles, rule outcome frequencies, and rule outcome disposition frequencies may be provided in any suitable manner.

A "remote server computer" may include to a computer that is remotely located with respect to a client computer. In some embodiments, a remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A "request processing system" can include one or more computers for processing payment. The request processing system can be, for example, a payment management system for electronic commerce.

A "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may include a good or service, a physical building, a computer account or file, or a payment account. In some embodiments, a resource may refer to a financial product, such as a loan or line of credit.

A "resource provider" may be an entity that can provide resources such as goods, services, information, and/or access. Examples of a resource provider includes merchants, access devices, secure data access points, etc. A "merchant" may typically be an entity that engages in transactions and can sell goods or services, or provide access to goods or services.

A "risk level" may include results of a risk analysis or evaluation. A risk level may be in the form of a numeric or an alphanumeric value, such as a number from 1-10 or a letter from A-Z. A risk level may indicate a relative degree of risk in a particular situation, such as a transaction. In some cases, a higher risk level may indicate high risk, while a lower risk level may indicate low risk.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

A "user device" may be any suitable device that is operated by a user. Suitable user devices can be portable and can communicate with external entities such as access devices. Examples of user devices include cards that have data stored on them, access cards, smart cards, etc. A payment device may be an example of a user device.

DETAILED DESCRIPTION

Reviewing transactions to determine whether there is fraudulent activity can be a time consuming and tedious process. Example embodiments provide for automated techniques for identifying fraudulent activity and for determining whether transactions should be accepted or declined. An example embodiment provides for the automated generated of a consolidated view that can include user identity information and user historical transaction information.

I. Method for Transaction Review

FIG. 1 illustrates a method 100 for reviewing transactions. As shown in FIG. 1, a user 110, such as a customer or consumer, may want to conduct a transaction with a resource provider. The transaction may be conducted electronically through a website 120 of the resource provider. Prior to approving the transaction, the resource provider may want to determine whether or not the transaction is fraudulent. Therefore, the resource provider may request that a transaction processing system determine whether the transaction is fraudulent.

At step 101, the resource provider can send information to the transaction processing system in order to determine whether the transaction is fraudulent. Information that is sent to the transaction processing system can include information regarding the resource provider (i.e., an ID of the resource provider and a key associated with the resource provider) and information regarding the customer (i.e., user address, user credit card information, shipping address, and transaction data). Information regarding the customer can also include credit card account information.

At step 102, the transaction processing system can determine whether the transaction has been authenticated. During authentication, it is determined whether the key provided by the resource provider matches a key stored in the transaction processing system for the resource provider. If the transaction has not been authenticated, that is, the resource provider has provided the wrong key, at step 103, the transaction processing system can decline the transaction, and no further processing will be performed.

If the transaction is authenticated, at step 104, the transaction processing system can determine whether the resource provider has been enabled fraud check. Specifically, the transaction processing system can determined whether the resource provider has registered or enrolled with a fraud check system provided by the transaction processing system. If the resource provider has not enabled a fraud check, at step 105, the transaction can proceed without performing a fraud check.

If the resource provider has enabled fraud check, at step 106, the transaction processing system will apply rules to the transaction. The rules that are applied to the transaction are rules that have been pre-configured by the resource provider. The rules can be configured during enrollment or after enrollment with the fraud check system.

Example rules that have been configured by the user, include the following. Rule 1: If the amount<$1,000 then Accept the transaction. Rule 2: If the amount>$5,000 & Quantity>2 then set it for Manual Review. Rule 3: If the amount>$10,000 & Quantity=1 then Reject the transaction. However, these are merely examples and other rules may be configured by the resource provider.

A resource provider can indicate which transactions they would like to be accepted (step 108), rejected (step 107), or manually reviewed (step 109). A transaction that has been flagged for review can be called a case. For example, an amount over $10,000 may be marked for rejection since the resource provider does not sell or provide any items and/or services that are over $10,000. Therefore, as shown in step 107, certain transactions may be rejected based on the rules configured by the resource provider. As shown in step 108, certain transactions may be accepted without requiring review. As shown in step 109, certain transactions may require review before being accepted. The resource provider can configure rules which will be used to determine whether or not a transaction should be manually reviewed. If a transaction is marked for review (step 109), then the transaction can be reviewed by customer support 130.

If a transaction is identified as a transaction for manual review, then a reviewer 130 will perform a manual review of the transaction. A reviewer can be an employee or person who will analyze details of the transaction, such as customer support. The reviewer will manually validate the transaction data, check the customer data, and determine if the transaction is fraudulent.

However, this is a very time-consuming and tedious process. Hundreds of cases may be flagged as requiring review at a given time. Further, since the review is performed manually by a reviewer, there can be human error in the determination.

Therefore, an example embodiment provides a request processing system including a reviewer computer that is capable of evaluating a transaction when a request to review a transaction is received. The request processing system can independently determine the likelihood that a transaction is fraudulent and whether the transaction should be accepted or declined.

II. Method and System for Automated Transaction Review

Figure 2:
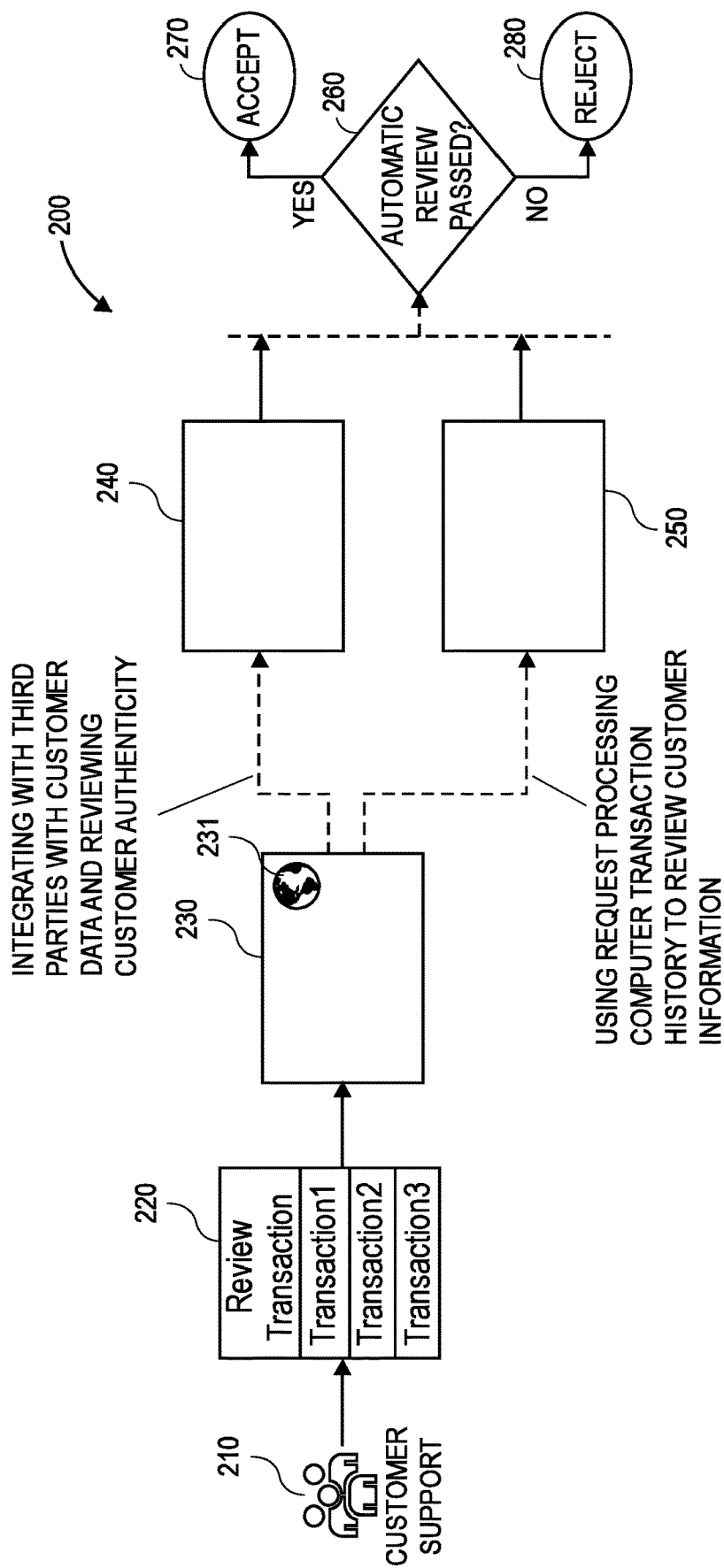
FIG. 2 is a schematic overview of the method of reviewing a transaction, in accordance with some example embodiments.
Figure 3:
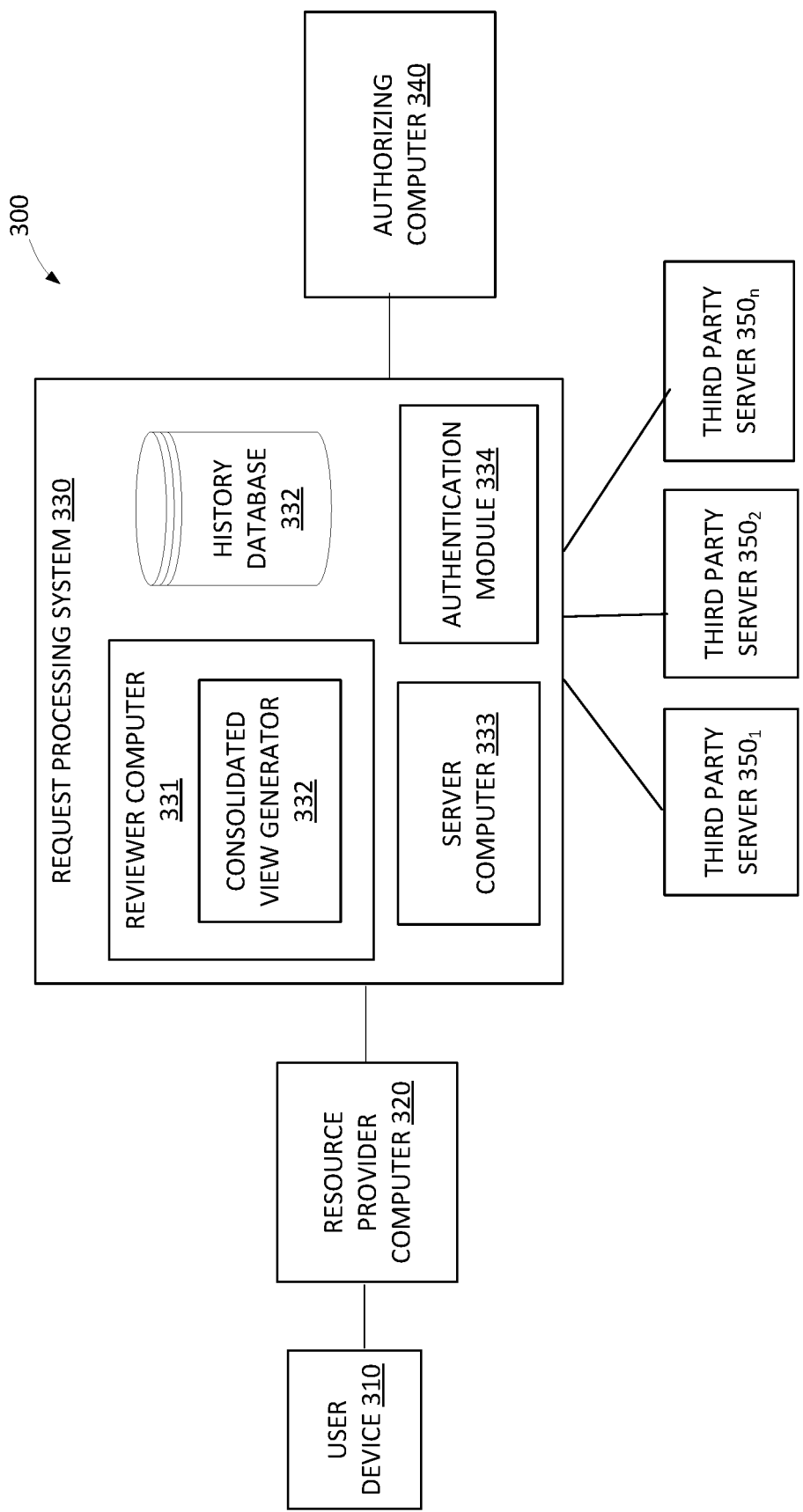
FIG. 3 illustrates a request processing system, in accordance with some example embodiments.

FIG. 2 is a schematic overview of a method 200 of reviewing a transaction, in accordance with some example embodiments. Method 200 will be explained with respect to FIG. 3. FIG. 3 illustrates a system 300 for reviewing a transaction, in accordance with some example embodiments.

The system 300 can include a user device 310, a resource provider computer 320, a request processing system 330, an authentication module 334 and external servers, such as, third party servers $350_1$-$350_n$, and an authorizing computer 340. The request processing system 330 can include a reviewer computer 331, a history database 332, a server computer 333 and an authentication module 334. The request processing computer can include the functions of the transaction processing system shown in FIG. 1. The reviewer computer 331 can include a consolidated view generator. Although the reviewer computer 331 and a history database 332 are shown being integrated with the request processing system 330, reviewer computer 331 and a history database 332 may be separate from the request processing system 330. The reviewer device 310 may be used by a reviewer computer user, such as customer support.

The reviewer computer 331 of the request processing system 330 can streamline a process for reviewing a transaction. The reviewer computer 331 can access customer information from external servers, such as, third party servers $350_1$-$350_n$. The customer information from the external servers can be used to verify the validity of the user information. Based on the information obtained from the third party servers $350_1$-$350_n$, the reviewer computer 331 can verify the identity of the customer. The information obtained by the reviewer computer 331 can be aggregated by the reviewer computer 331 and presented in a consolidated view.

The reviewer computer 331 can leverage a customer's transaction history. The reviewer computer 331 can access transaction history information associated with the customer. The customer's transaction history can be internal or external to the request processing system 330. For example, the customer's transaction history can be stored in an external database, such as history database 332. The history database 332 can store on or more historical user transaction. The reviewer computer 331 can match the customer's transaction data with customer transaction history data. The customer transaction history data can help validate customer information more accurately.

Further, the reviewer computer 331 can independently and without user intervention determine whether to accept or decline a transaction. The reviewer computer 331 can determine whether to accept or decline a transaction based on a consolidated view generated by the consolidated view generator. The consolidated view can also be known as an aggregated view. The consolidated view can be presented to a reviewer and based on the information in the consolidated view the reviewer can determine whether or not to accept or decline the transaction.

Alternatively, the reviewer computer 331 can generate a score for the transaction and based on the score, the reviewer computer 331 can independently determine, without intervention from a user, whether or not to accept or decline the transaction. A score can be generated based on similar search data from history and consumer information accuracy by integrating with third party applications (e.g., Whitepages pro). A score can be defined for each of the data in accordance with business rules. An exact score can be calculated for each transaction and displayed to a reviewer.

The consolidated view can be provided to a user quickly. Alternatively, the reviewer computer 331 can quickly determine whether or not to accept or decline a transaction based on the consolidated view.

As shown in FIG. 2, at step 210, customer support can be requested to review one or more transactions by a transaction being sent to a reviewer computer, e.g., as depicted at the end of the review block in FIG. 1. Customer support can include one or more employees of the request processing system. A transaction can be an electronic transaction between the customer and the resource provider. For example, the transaction may be made by the customer using a website of the resource provider. A customer can also be referred to as a user. The data that is generated in response to the customer making the transaction can also be known as original data or original transaction data.

Customer support can be requested to review the transaction if the resource provider has a concern that the transaction is fraudulent. Transactions may be flagged for review based on rules that are preconfigured by the resource provider.

An example embodiment can assist reviewers in determining whether a transaction is fraudulent. Prior to generating a consolidated view for performing the fraud determination, it can be determined whether the transaction has been authenticated. A transaction can be authenticated if an authentication module 334 has authenticated the transaction.

During authentication, it is determined whether the key provided by the resource provider matches a key stored in the transaction processing system for the resource provider. If the transaction has not been authenticated, that is, the resource provider has provided the wrong key, at step 103, the transaction processing system can decline the transaction, and no further processing will be performed.

If the authentication is successful, the reviewer computer determines if the resource provider is enrolled in the fraud check system. The fraud check system can also be known as a user verification system. The resource provider can register with the resource provider computer in order to enroll in the fraud check system.

A server computer of the request processing system can determine whether the resource provider is enabled for fraud check. If the resource provider is not enabled for fraud check, then the transaction proceeds and a fraud check is not performed. If the resource provider is enabled for fraud check, then the preconfigured rules that were created by the resource provider are applied to the transaction. The request processing system can determine whether resource provider is enrolled in the fraud check system.

A resource provider may preconfigure rules with the request processing system in order to more accurately determine whether or not the transaction is fraudulent. The resource provider may configure one or more rules with a request processing system. However, instead of a rule which results in manual review of the transaction, the transaction can be reviewed automatically by a reviewer computer. Therefore, example rules include the following examples. Rule 1: If the amount<$1,000 then Accept the transaction. Rule 2: If the amount>$5,000 & Quantity>2 then set the transaction for review. Rule 3: If the amount>$10,000 & Quantity=1 then Reject the transaction.

At step 220, the one or more transactions can be displayed on the reviewer computer for review. The one or more transactions can be provided to the reviewer computer from a server computer. Each transaction that is sent to the request processing system can be called a case. Each case can include information to be used to determine whether to authorize the transaction. The details of a case are discussed in greater detail with respect to FIG. 6, which illustrates case details. Details can include user address information, user credit card information, and other transaction data from the resource provider. A user may make a selection for case details by selecting, for example, a button on the user interface of the user device.

If the resource provider is enrolled in a fraud check system offered by the request processing system, then a reviewer computer 331 of the request processing system 330 can review the transaction. However, if the resource provider is not enrolled in a fraud check system, then the request processing system may not review the transaction. The request processing system can notify the resource provider that they have not subscribed to the fraud check system. In the event the resource provider is registered with a fraud check system, then a reviewer computer can review a transaction marked for review.

When the resource provider is subscribed with the request processing system, the request processing system can provide the resource provider with a transaction key. The transaction key can also be known as an enrollment key or a provider key. The transaction key is a key that is associated with the resource provider. The transaction key can be provided to the reviewer computer at the time of enrollment with the fraud check system. The transaction key can be provided by a server computer of the request processing system. The transaction key provides the resource provider with access to the request processing system portal. The resource provider can access the portal and configure rules regarding transactions. The resource provider can log on to the portal and define rules that are relevant for their business using their transaction key. The transaction key of the resource provider is unique to the resource provider. A plurality of different resource providers can each have their out unique transaction key which can be used for configuring the fraud check system.

When a customer makes a transaction using a website of a resource provider, for example, if the customer purchase an item on the resource provider's website, a unique identifier associated with the transaction and a transaction key associated with the resource provider is sent to the request processing system. Information associated with the customer is also sent to the request processing system. During the transaction, the resource provider obtains information about the customer, such as their address, credit card information, and shipping address. This information associated with the customer can be sent to the request processing system.

The steps shown in FIG. 2 can be performed by a request processing system. Specifically, the steps shown in FIG. 2 can be performed by reviewer computer 331 of the request processing system 330.

At step 230, information associated with a transaction can be gathered and displayed in a case details screen. The case details can be displayed on a user interface. The case details can also be known as a transaction details. The case details are described in greater detail with respect to FIG. 6.

Figure 6:
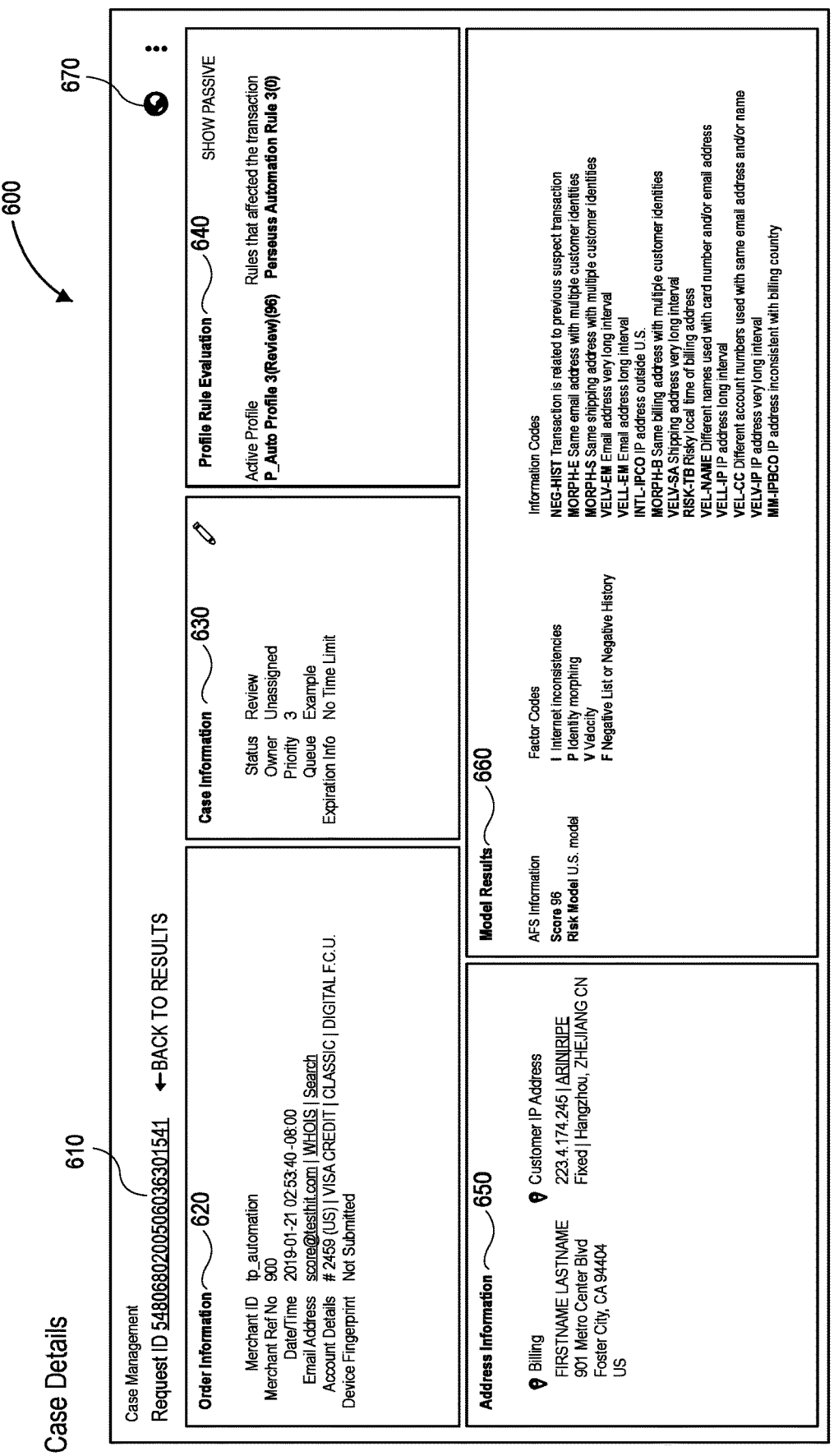
FIG. 6 illustrates a user interface displaying case details, in accordance with some example embodiments.

FIG. 6 illustrates a user interface 600 displaying case details, in accordance with some example embodiments. The case details can be provided when a reviewer requests to view the case details on a user interface. The case details that are shown for a transaction can come from a transaction request that is sent to the request processing system. The case details can also contain data that indicates a status of the transaction, such as whether it was "Accepted," "Rejected" or a decision still needs to be made.

As shown in FIG. 6, the case details includes information about the customer making a transaction and information associated with the transaction. The case details can be displayed on a user interface of a device of a reviewer computer user. As shown in FIG. 6, the case details can include request identification (ID) 610, order information 620, case information 630, profile rule evaluation 640, address information 650 and model results 660. The case details can also include a marker 670. As shown in FIG. 6, the marker 670 is a globe.

Request identification (ID) 610 can be information that is used to identify the request. The request ID can include a series of numbers and/or letters that can be used to distinguish different requests. The requests are requests that can be received by a request processing system from an authentication computer to review a transaction. The request identification can be generated at the time that a transaction request is sent to the request processing system. A unique identifier can be generated for every transaction request that is sent to the request processing system Order information 620 can include information associated with the transaction that the customer would like to make. For example, order information 620 can include a merchant ID, merchant reference information, a date and time of the transaction, an account used to make the transaction and whether or not a fingerprint of the device being used by the customer is provided.

Case information 630 can include information such as whether the case needs to be reviewed, who the case has been assigned to, a priority ranking, and when the request will expire. Case information can also include a queue. A queue can be defined at the resource provider level. Queues can be assigned to a reviewer. When a transaction is executed based on the preconfigured rule, the transaction can go to a defined queue corresponding to the preconfigured rule. Further, queues provide a system for organizing transactions into different categories. Resource providers can create different queues for different service level agreements (SLAs), or resource providers can create queues for different ranges of transaction amounts. Resource providers may want to maintain different queues for different use cases.

Profile rule evaluation 640 can include active profile information and rules that are affected by the transaction. A profile can include a set of rules. Certain rules can be applicable to a transaction and will be executed for a transaction. Active Profile Information indicates which rules from the profile were executed for the transaction. An example of a profile could be that any transaction which is associated with a card from processing network server computer X is to be tracked under X Profile. An example of a rule under the X Profile is to automatically accept the transaction if transaction amount is less than $20. Any transactions which come to the request processing system can be run against this profile. After running the profile against the transaction, the transaction will either be identified as "Review," "Accepted" or "Rejected" based on the profile.

Address information 650 can include address information about the customer. For example, address information can include first name, last name, street, city, state, zip code and country information associated with the customer making the transaction.

Model results 660 can include Advanced Fraud Screen (AFS) information, factor codes, and information codes. Factor codes are codes that are documented by a decision manager system for the resource providers. The resource providers can review the codes and the corresponding definition. The model results 660 can also include a score and can identify a risk model that is used. The score shown in model results 660 can be based on a determination made by a decision manager system.

The case details shown in FIG. 6 is merely an example, and additional and/or alternative information may be displayed. The case details can provide a view of the user's data with one or more third-party systems and a view of the consumer data with respect to one or more resource providers associated with the request processing system.

The original transaction data can be compared with third party information and transaction history information in order to determine whether the transaction is fraudulent. A transaction may be fraudulent if the customer making the transaction may have improper access to another customer's payment information.

After viewing the case details, user information and transaction history information may be obtained by selecting the marker 650. A reviewer can indicate that they would like to obtain user information in order to confirm an identity of the customer in the transaction. The user information can be provided in a consolidated view of user information. Although a decision can be made based on confirmed user identity information, a more accurate decision can be made by verifying if there have been previous successful transactions and looking at transaction history information.

Further, the reviewer may want to view transaction history information in order to determine whether information associated with the transaction can be seen in other transactions. The transaction history information can be provided as a consolidated view of transaction history information. The user information and transaction history information can be obtained by clicking or selecting a marker on the case details displayed on the user interface. As shown in FIGS. 2 and 6, the marker can be an image of a globe. However, this is merely an example, and other types of markers can be used.

Therefore, at step 240, information from third party systems can be obtained and integrated with customer data in order to generated a consolidated view of user information. The information from the third party systems can be obtained from third party servers $350_1$-$350_n$. The integration of the third-party information with customer data can be used to determine whether a customer is authentic. An application programming interface (API) specific to obtaining the third party information can be used.

After verifying the information from the third party system, user information can be updated. The user information can be displayed on a user interface. Verified user information is discussed in greater detail with respect to FIGS. 10B and 11B.

At step 250, historical transaction information can be obtained in order to generate a consolidated view of historical transaction data. The consolidated view of historical transaction data is explained in greater detail with respect to FIGS. 10A and 11A.

In generating the consolidated view of the historical transaction information, transaction history information can be obtained. The transaction history information can be obtained from, for example, history database 332. The history database 332 can store transaction history information about a customer and one or more merchants. It can be determined whether current user information in the transaction information matches historical user information in the historical user transactions, thereby generating matching historical user information.

Therefore, the merchant transaction history information that is used to analyze a case is not limited to the merchant associated with the original transaction. A customer's history with different merchants can be used to analyze the case. A customer's history information can be validated using a customer's transaction history information with a merchant that is different from the merchant in the case being reviewed.

Since the data stored in the history database is encrypted and stored in a secure format, an application programming interface (API) specific to accessing the history database can be used. The API for accessing the history database can be known as a history API. The history API can provide previous transactions which match a particular set of user information such as the original transaction data.

At step 260, the reviewer computer can determine, based on the third-party information obtained in step 240 and the transaction history information obtained in step 250, whether or not the transaction has passed review. If the transaction has passed review, at step 270, the transaction to be accepted. If the transaction has not passed review, at step 280, the transaction can be rejected. Steps 230, 240, 250, 260, 270, and 280 can be performed independently by a request processing system.

Therefore, a reviewer does not need to review the information in order to make a determination. The request processing system can notify the reviewer as to its decision regarding the transaction. However, the reviewer can also review the consolidated view information prior to making a decision.

An example embodiment provides an automated review system that will streamline the transaction review process. The customer information and identity verification information from one or more third party systems can be presented to a user in a consolidated view. By providing a consolidated view that presents all of the data needed to analyze a transaction in one location, reviewers can more easily determine whether or not the transaction should be authorized.

The combination of the user information obtained in step 240 and the transaction history information obtained in step 250 can also be called a consolidated view or a combined consolidated view. The combined consolidated view can be presented on a user interface that can be easily used by the user. The user interface can also be interactive. Items on the consolidated view can be selected by a reviewer. The combined consolidated view can be used by the reviewer computer to automatically and independently determine whether or not the transaction should be authorized. Alternatively, a user can use the consolidated view in order to determine whether or not the transaction should be authorized. The transaction can be authorized by authorizing computer 340.

The reviewer computer 331 can resolve a case by accessing resources from internal and third-party systems. The results of the determination by the reviewer computer can be provided to the resource provider computer. The resource provider computer can confirm that the transaction can proceed and that the customer may make the transaction.

Cases for review can be resolved in an efficient way by reviewing the customer's identity and transaction history and providing the information in an aggregated view.

A. Method for Reviewing Transaction

Figure 4:
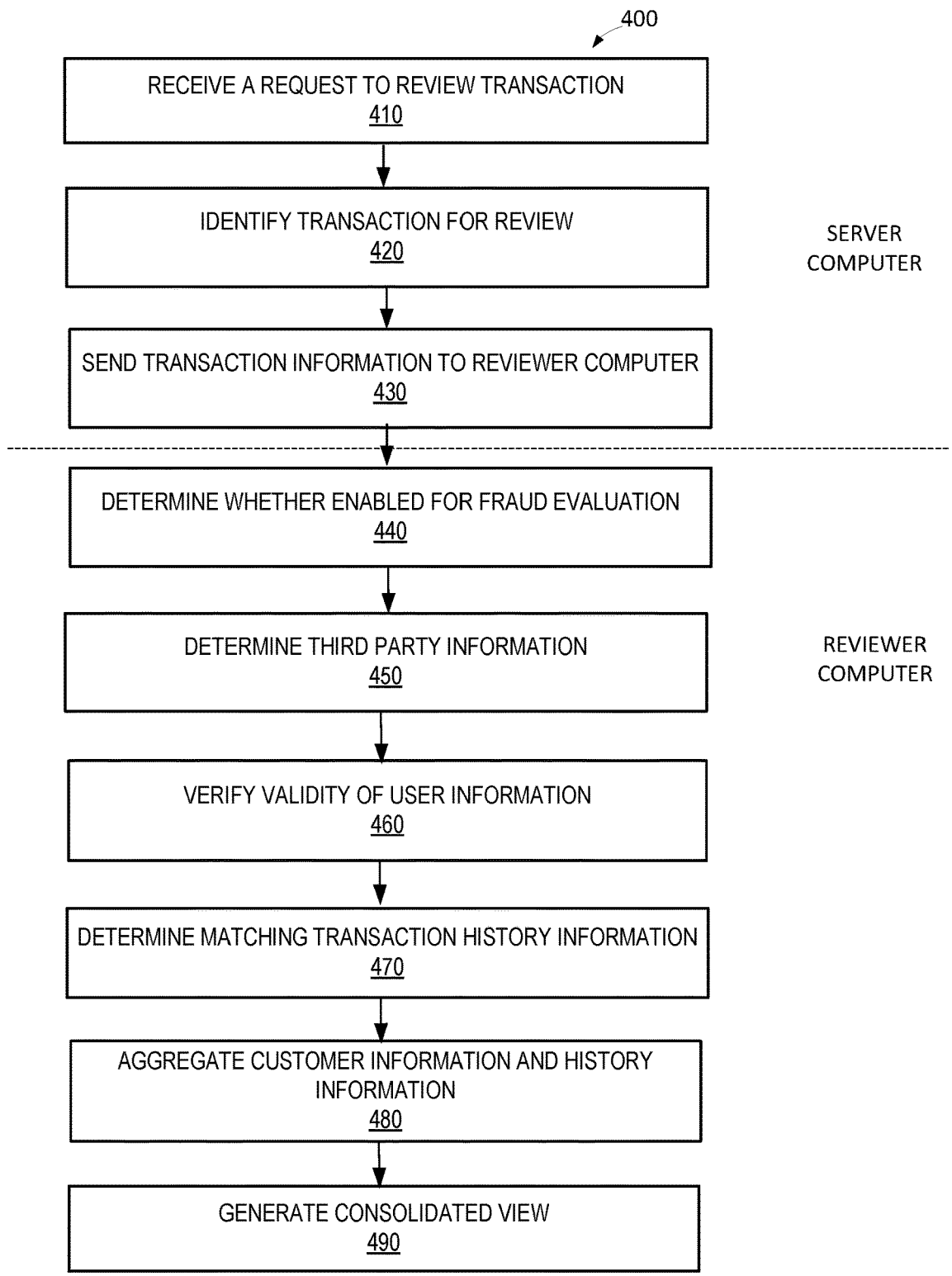
FIG. 4 is a flowchart of a method of reviewing transaction information, in accordance with some example embodiments.

FIG. 4 is a flowchart of a method 400 of reviewing transaction information, in accordance with some example embodiments. Steps 410, 420 and 430 can be performed by a server computer of the request processing system. Steps 440, 450, 460, 470, 480 and 490 can be performed by the reviewer computer of the request processing system.

A customer may request to conduct a transaction with a resource provider. A customer can also be referred to as a user. The transaction may be marked for review based on, for example, rules that are configured by the resource provider. For example, the transaction may fall under rules that were set by the resource provider as requiring review.

Since the transaction has been marked for review, at step 410, the request processing system receives a request to review a transaction that has been flagged for review. The transaction that has been flagged for review can also be called a case. The reviewer computer can determine whether the customer is authorized to access the resource.

Although the example described in FIG. 4 is with respect to a single transaction, a plurality of transactions can be marked for review. Therefore, a plurality of authorization requests to access ones or more resources may be sent to the request processing system. One or more reviewer computers of the request processing system can be selected to review the plurality of transactions.

At step 420, the server can identify transactions for review based on the preconfigured rules set by the resource provider computer. A resource provider can indicate which transactions they would like to be accepted, rejected, or reviewed. A transaction that has been flagged for review can be called a case. If a transaction has been accepted, then the transaction can be sent to an authorizing computer and the transaction can be authorized.

At step 430, after identifying the one or more transactions for review, the server computer can send the transactions to the reviewer computer.

At step 440, the reviewer computer determines third party information that can be used to verify the identity of the customer making the transaction. The third-party information can be accessed via third party servers that are external to the request processing system 330. Third-party servers can include, for example, email-based fraud prevention servers, online directory servers, fraud screening servers, identity verification servers, and/or public record servers. These are merely examples of third-party servers and other third-party service can be used to verify the identity of a customer. The reviewer computer can determine third-party information that is associated with the customer of making the transaction.

The validity of the customer information can be determined using third party information. Step 420 is explained in greater detail with respect to FIG. 5.

Step 450, the validity of the customer information in the case is determined. The reviewer computer can verify the validity of the user information based on the third party identification information.

At step 460, transaction history information can be determined. For example, it can be determined if customer information exists in the history database of the request processing system. It can be determined whether the customer has a history of transactions with one or more resource providers. The history of transactions can be stored in the history database. The transaction history information can be obtained from one or more server systems that are internal to the request processing system.

The transaction history information can be used to review the customer information. If it is determined that there is transaction history information that matches the original transaction, the matching data can be used to determine the validity of the customer.

At step 470, the user information and the user transaction history information can be aggregated and used to generate a consolidated view. If there is no transaction history information that can be obtained at step 460, then the consolidated view can be based on the customer information obtained in steps 440 and 450.

At step 480 the consolidated view can be generated based on the aggregated data. Further, the consolidated view can be displayed on a user interface a reviewer computer user device. If there is no customer information and no transaction history information for the customer, then the transaction will be flagged for rejection. The method shown in FIG. 4 can be performed in real-time.

B. Verifying User Information

Figure 5:
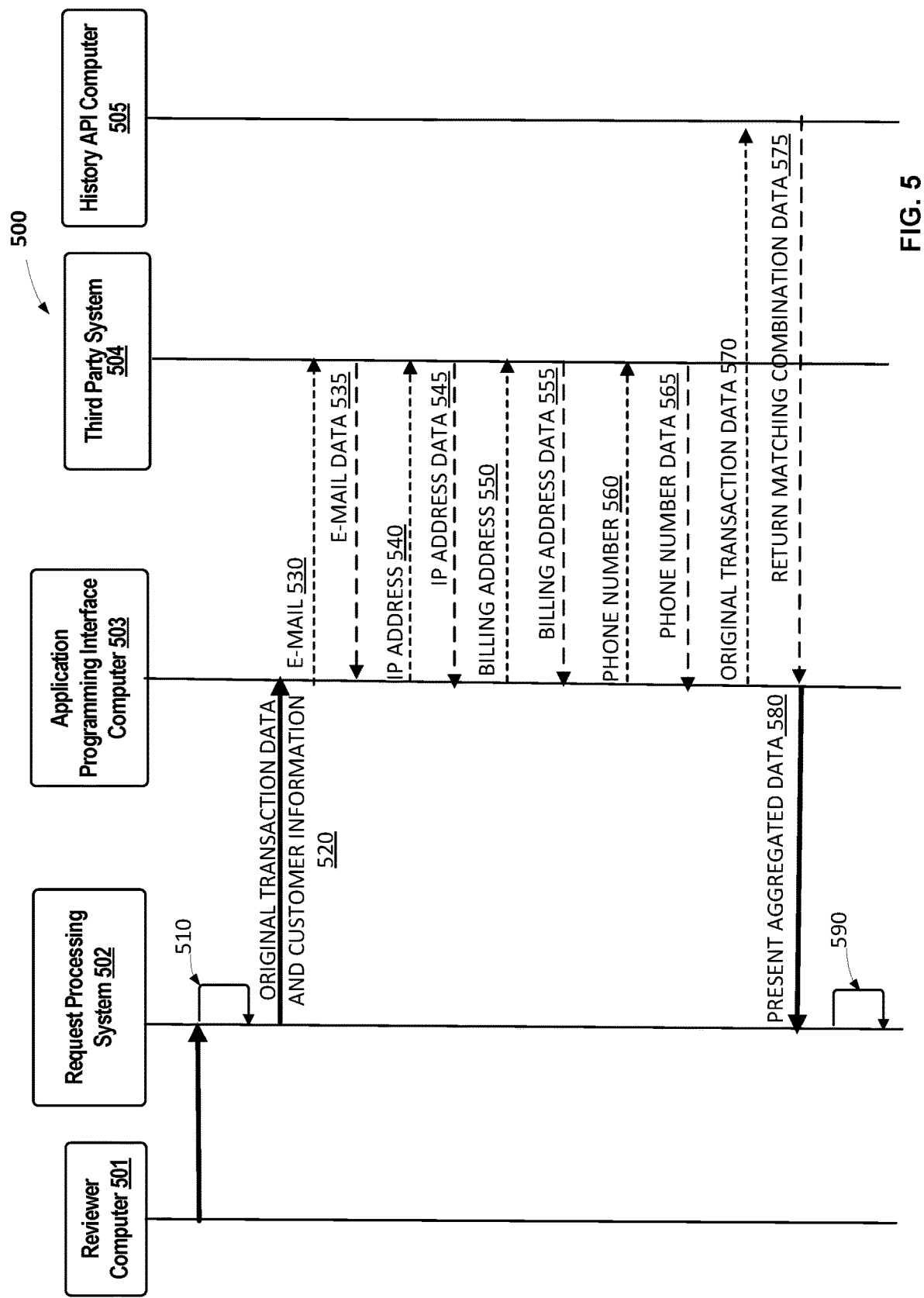
FIG. 5 is a schematic diagram for verifying the validity of customer information and generating a consolidated view, in accordance with some example embodiments.

FIG. 5 is a sequence diagram 500 for verifying the validity of customer information and generating a consolidated view, in accordance with some example embodiments. FIG. 5 illustrates a sequence of communications between a reviewer computer 501, an electronic business center 502 of the reviewer computer, an application programming interface (API) 503 of the reviewer computer, a third-party system 504, and a history application programming interface (API) 505 of the reviewer computer. The third-party system 504 is a computer that is separate from the reviewer computer.

As shown in FIG. 5, at step 510 a reviewer computer 501, such as a resource provider customer support vendor, may log into the request processing system 502 in order to review a transaction and determine whether the transaction should be authorized. A reviewer can log into the system using an application programming interface 503 in order to review the transaction. When a reviewer logs into a portal for the reviewer computer, they will be provided with a list of cases requiring review. A reviewer computer user can log into the portal using a transaction key which has been provided to them by the request processing system.

The reviewer computer user can get a list including one or more transactions which are in a review status. The user can click on each of these transactions and view the case details. The case details can also be known as transaction details. An example of case details is shown in FIG. 6. The user can select a transaction by, for example, clicking on identifying information associated with the transaction. Selection of the identifying information associated with the transaction, such as a case ID, can direct user to case details for the transaction. The information that is shown in the case details can be obtained from third party systems.

At step 520, the original transaction data received from the resource provider computer can be provided by the reviewer computer 501 to an application programming interface (API) 503 of the reviewer computer. The original transaction data can include customer information.

Customer identity verification information can be obtained from one or more third parties 504 at steps 530, 535, 540, 545, 550, 555, 560 and 565. The customer information can be obtained from systems that are external to the request processing system.

The API computer 503 can integrate the data from the third party systems 504 in order to generate a consolidated view. The API computer 503 can be configured to automatically obtain the third-party system information upon receipt of a transaction for review.

The customer information can be reviewed using one or more different types of third party system information. For example, third-party systems can include social websites, such as Facebook, LinkedIn, and Twitter. Third-party systems can also include email fraud verification systems and people directories, such as Whitepages.

These are merely examples and other third-party systems which can be used to verify the identity of the customer can be used. Information from these third-party applications can be used to verify whether the customer information, received from the original data in the transaction that is being reviewed, matches information that exists in third-party systems.

At step 530, the application programming interface (API) 503 of the reviewer computer can send email information associated with the customer making the transaction to a third party server system. If a customer has provided an email address, it can be determined whether the email has been registered with the domain and whether the email owner matches with the customer. The API 503 can send the email address information to a third party system such as email verification system.

At step 535, email information about the customer is received from one or more third parties. It can be determined when the email address was registered with the domain and if the owner of the email address matches the customer making the transaction.

At step 540, the application programming interface 503 of the reviewer computer can send IP address information associated with the customer device associated with the transaction. The API 503 can send the IP address information to a third party system such as an IP address verification system. At step 545, IP address data from one or more third parties can be received.

The IP address of a device being used by the customer can be checked to see if the IP address of the device is a risky proxy. Further, the IP address can be used to obtain additional information such as GeoLocation, distance to billing address, and distance to phone number.

At step 550, the application programming interface 503 of the reviewer computer can send billing address information associated with the customer making the transaction. If billing address information is provided in the original transaction data, it can be determined whether the billing address that is provided matches the customer. At step 555, billing address data from one or more third parties can be received.

At step 560, the application programming interface 503 of the reviewer computer can send phone number information associated with the customer making the transaction. If a phone number is provided, it can be determined whether the phone number that is provided matches the customer. At step 565, phone number data from one or more third parties can be received.

The various types of information (e.g., email address, IP address, billing address, phone number) can be obtained from a same third-party system or can be obtained from a plurality of different third-party systems. Further, email address, IP address, billing address, and phone number are described with respect to FIG. 5, however, various other types of information can be used to verify customer information. Specifically, any kind of information that can be used to verify a customer's identity can used.

Figure 11B:
FIG. 11B illustrates a consolidated view of user information corresponding to the rejected transaction, in accordance with some example embodiments.

FIGS. 10B and 11B illustrate a consolidated view of user information that is obtained after performing steps 530, 535, 540, 545, 550, 555, 560, and 565. FIG. 10B illustrates a consolidated view of user information 1050 corresponding to an accepted transaction, in accordance with some example embodiments. FIG. 11B illustrates a consolidated view of user information 1150 corresponding to a rejected transaction, in accordance with some example embodiments.

As shown in FIG. 10B, after third party information is obtained, the reviewer computer has determined that the email information in the original transaction matches email information about the customer that is obtained from third party systems. The user information 1050 also indicates that the email address associated with the original transaction was created two years back. The user information 1050 indicates that the billing address and shipping address from third party systems match the billing address and shipping address information from the original transaction. The user information 1050 indicates that the billing phone number and the shipping phone number of the original transaction match billing phone number and the shipping phone number that is available from third party systems. Further, the reviewer computer has determined at the IP address of the device used by the customer in making the transaction is not a risky proxy. Therefore, the user information 1050 indicates that there is a high likelihood that the identity of the customer making the transaction is valid.

As shown in FIG. 11B, after third party information is obtained, the reviewer computer has determined that the email information in the original transaction does not match email information about the customer that is obtained from third party systems. The user information 1150 also indicates that the email address associated with the original transaction was created three days ago. The user information 1150 indicates that the billing address and shipping address from third party systems do not match the billing address and shipping address information from the original transaction. The user information 1150 indicates that the billing phone number and the shipping phone number of the original transaction do not match billing phone number and the shipping phone number that is available from third party systems. Further, the reviewer computer has determined at the IP address of the device used by the customer in making the transaction is not a risky proxy.

Therefore, based on the user information 1150, the reviewer computer can determine that there is a high likelihood that the identity of the customer making the transaction is not valid.

The third party systems can be used to identify additional user information. For example, when searching for an address used in the original transaction, additional names associated with the address can be identified and displayed in the user information interface.

After user information has been obtained, transaction history information can be obtained. History application programming interface 505 can be used to obtain transaction history information. After the API computer 503 obtains the customer information from third-party systems, at step 570 original transaction data can be sent to a history API computer 505. Original transaction data is sent to the history API computer 505 order to determine whether that have been previous transactions performed by a customer having similar customer information to the customer information associated with the original transaction data.

The history API computer 505 of the reviewer computer can identify transactions with one or more resource providers having similar information to the customer information in the original transaction data. The history API computer 505 can obtain transaction history data from a history database.

If the history API computer 505 identifies transactions with similar customer information, the history API computer 505 sends the matching information to API computer 503. At step 575, transaction history data that matches the original transaction data that is obtained by the history application programming interface 505 is returned to the application programming interface 503.

API computer 503 can aggregate the matching data and present the aggregated data to the user. At step 580, the customer information and the transaction history information can be used aggregated to create a consolidated view. The consolidated view can also be known as an aggregated view. The aggregated data can then be presented to the reviewer computer user. The consolidated view of the aggregated data is shown in greater detail with respect to FIGS. 10A and 11A. Further, steps 670 and 580 are explained in greater detail below with respect to FIGS. 7A and 7B.

The consolidated view can be used to determine whether or not to accept or decline a transaction made by the customer. At step 590, after the reviewer computer has generated the consolidated view of the user information and the transaction history information, the reviewer computer can determine whether or not to accept or reject the transaction. After the reviewer computer has made a decision, the reviewer computer can forward their decision to a reviewer computer user for confirmation. Alternatively, a reviewer computer user may not need to confirm the decision made by the reviewer computer.

API computer 503 can aggregate the matching data and present the aggregated data to the user. The aggregated data can also be known as an aggregated view or a consolidated view. The aggregated data can then be presented to the reviewer computer user. The consolidated view of the aggregated data is shown in greater detail with respect to FIGS. 10A and 11A.

The reviewer computer can review the validity of the customer who making a transaction, e.g., purchasing an item or a service, at the resource provider's site and can also present the aggregated view to the reviewer.

Based on above sources of information, if a transaction satisfies most of the positive criteria then it can be a strong candidate for acceptance. Whereas if a transaction does not fit in any of the positive criteria then the transaction will be a strong candidate for rejection.

C. Historical Transaction Data

Figure 7A:
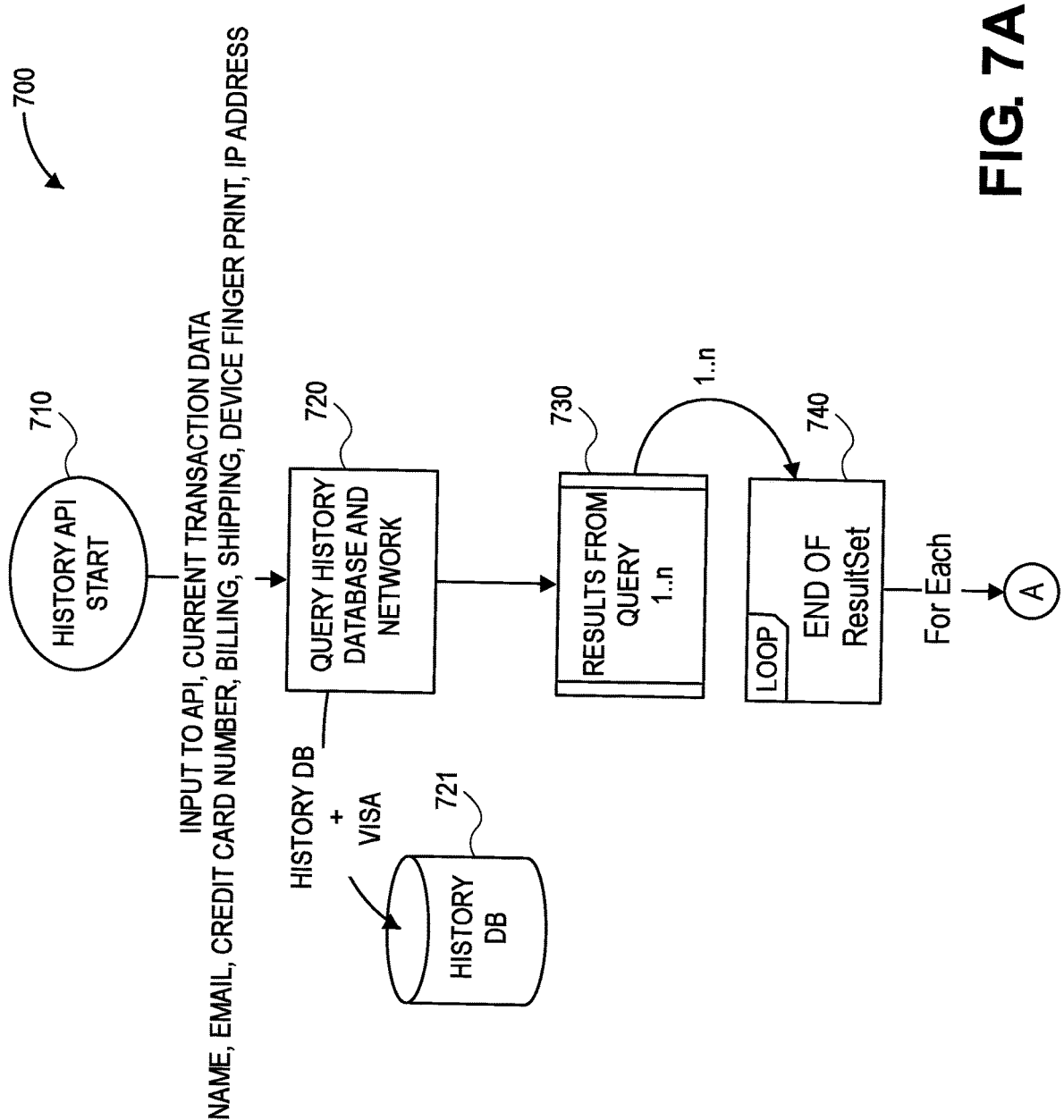
FIGS. 7A and 7B are schematic diagrams of a history application programming interface, in accordance with some example embodiments.
Figure 7B:
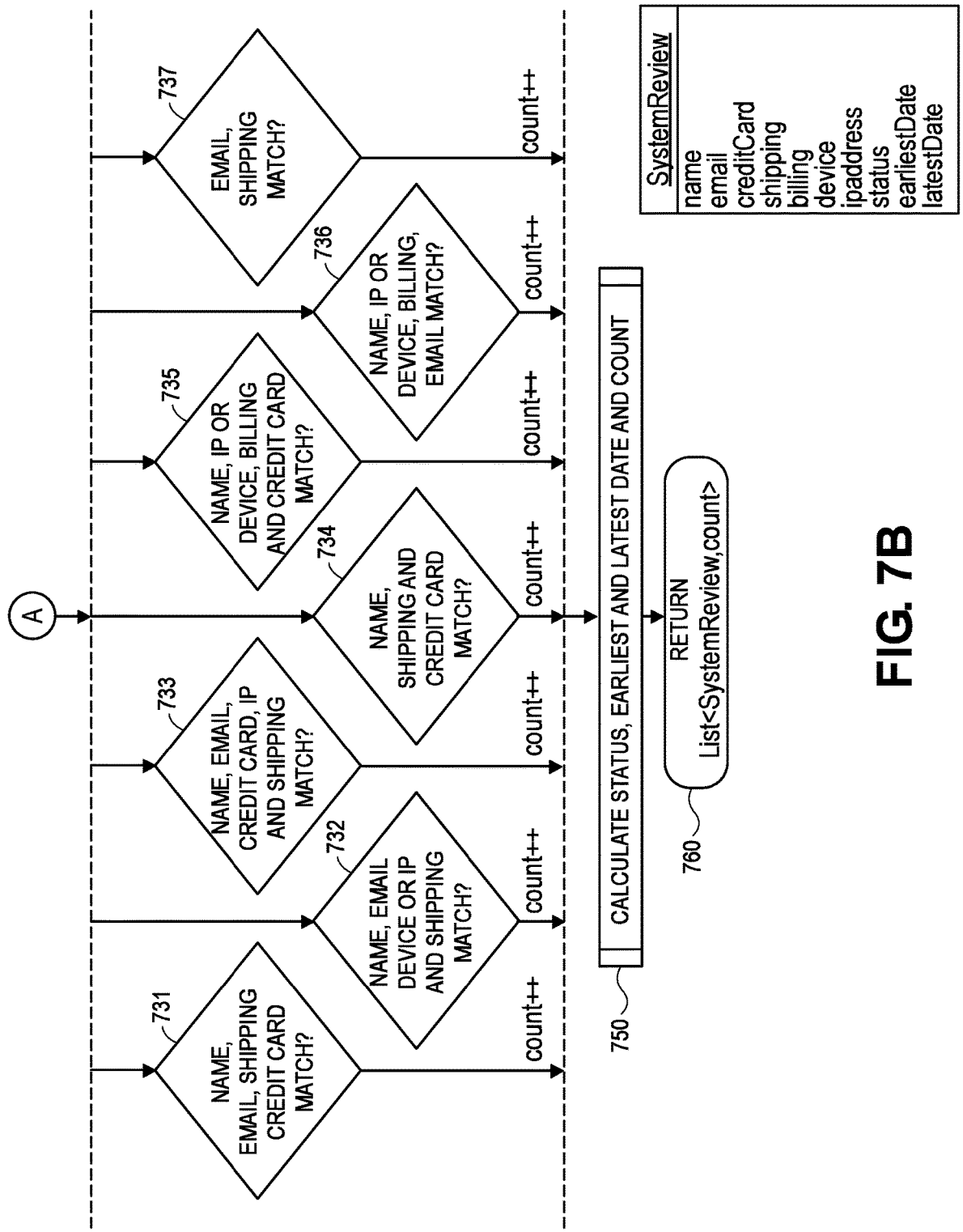

FIGS. 7A and 7B are schematic diagrams of a history application programming interface 700, in accordance with some example embodiments. As shown in FIG. 7A, if original data from a transaction request is received, the original data can be compared with transaction history information. As shown in step 710, a history application programming interface (API) can be started by the reviewer computer. Alternatively, the history API can be in a continuously on state and can be awaiting input information for analysis.

Figure 8:
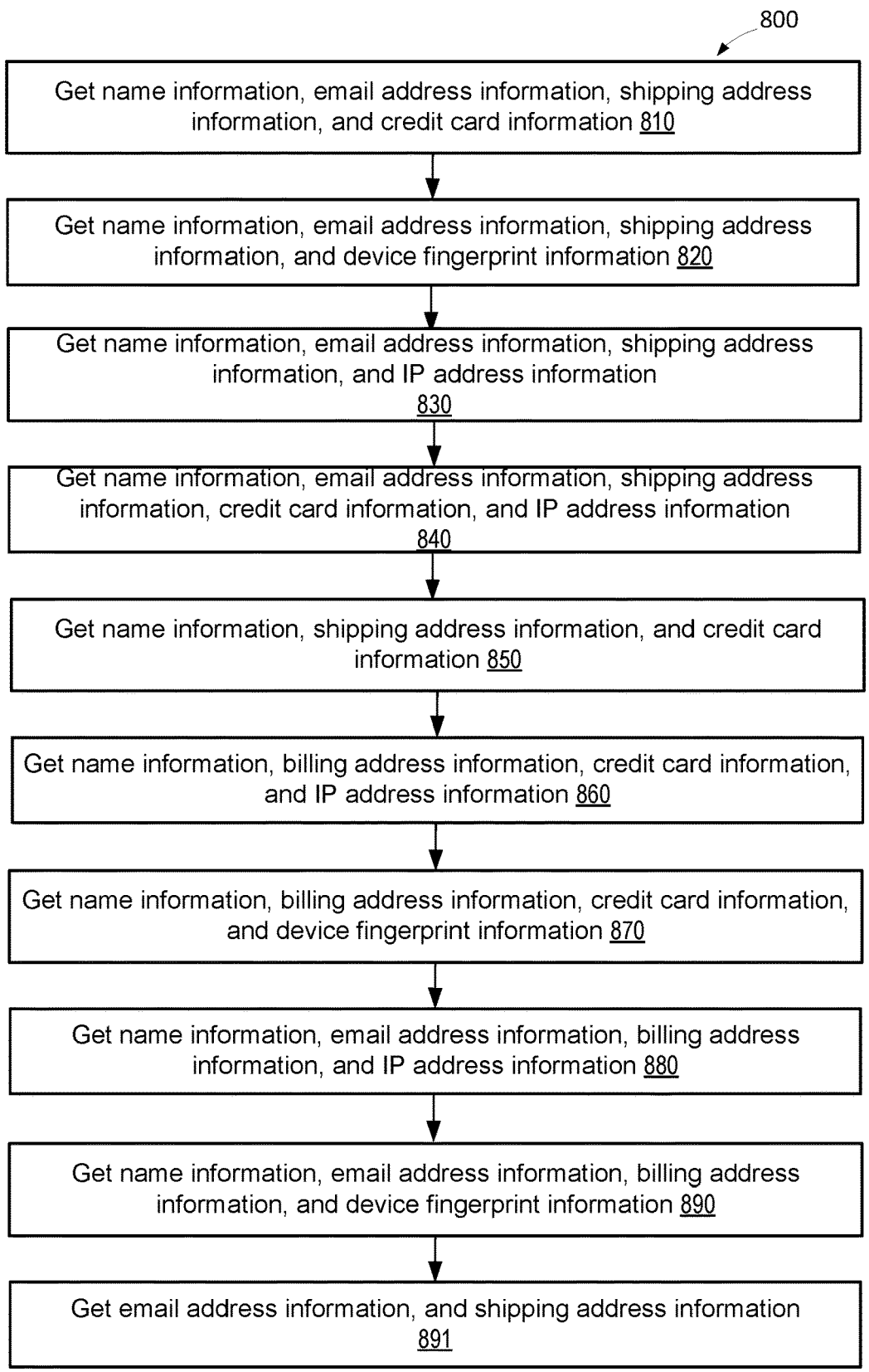
FIG. 8 is a flowchart of a method for sending get commands, in accordance with some example embodiments.

At step 720, the history database can be queried. A plurality of queries can be sent to the history database. As shown in FIG. 7, the plurality of queries can include queries 731, 732, 733, 734, 735, 736, and 737. The queries can also be called get queries or get commands as they are used to obtain information from the history database. A plurality of different query commands, as shown in FIG. 8 can be generated. The query commands can vary based on the desired transaction information.

After the queries have been generated, records in the history database can be accessed. Records can be accessed based on the consumer information for the user that initiated the transaction. Each of the queries can loop through all of the records and a count for the query can be updated for each record that matches the query. A hash table can be maintained for each query.

In response to data in the history database matching data in the query, a count can be updated. As the number of counts increase, it is more likely that a transaction will be accepted since there is a high number of instances in which the original data matches data in the history database.

At step 730, a result for each of the plurality of queries can be received. Each of the plurality of queries is shown as steps 731, 732, 733, 734, 735, 736, and 737 in FIG. 7B. For example, as shown in step 731, a query is sent to identify a historical transaction which has matching email address information, shipping address information, and credit card information. For every historical transaction that has email address information, shipping address information, and credit card information that matches the email address information, shipping address information, and credit card information in the original transaction data, then a count for that query can be updated. A similar matching process is performed for the different queries in steps 732, 733, 734, 735, 736, and 737.

At step 740, a resulting set can be obtained by combining the results of the plurality of queries. The results can be stored as a result set. A resulting set can be a combination of all of the results from all of the queries and the combined results can be provided as a view for the reviewer. The resulting set can include all of the conditional data based on the user information provided (i.e., user name, email, phone number, credit card number, etc).

At step 750, the status of each of the requests is calculated and the count for each of the requests is determined.

At step 760, the reviewer computer can return the results of reviewing the original data with transaction history information from the history database. The results can be provided in the consolidated view.

FIG. 8 is a flowchart of a method 800 for sending queries, in accordance with some example embodiments. Specifically, FIG. 8 describes the querying of the history database in greater detail. The queries can also be known as get requests, get commands, or get operations.

The history API can perform a plurality of separate gets for information. A plurality of get operations can be performed in order to determine whether there is a match between data in the original transaction data and data from transactions that have been performed in the past.

As shown in FIG. 8, at step 810, a get operation is performed for historical transaction data, which includes name information, email address information, shipping address information, and credit card information that match name information, email address information, shipping address information, and credit card information in the original transaction data.

For each historical transaction in which name information, email address information, shipping address information, and credit card information match name information, email address information, shipping address information, and credit card information in the original transaction data, the count will be updated.

As shown in FIGS. 10A and 10B, ten different combinations of user identification information are used to determine whether historical data matches data in the original transaction data. However, this is merely an example and different combinations can be used to determine matches with historical data.

As shown in FIG. 10A, for the combination of name information, email address information, shipping address information, and credit card information that match name information, email address information, shipping address information, and credit card information, the count is "5." The count can also be referred to as a count value. Therefore, there have been five historical transactions in which name information, email address information, shipping address information, and credit card information match name information, email address information, shipping address information, and credit card information in the original transaction.

At step 820, a get operation is performed for historical transaction data, which includes name information, email address information, shipping address information, device fingerprint information. If name information, email address information, shipping address information, and device fingerprint information from the original transaction match historical data, then the count for that row will be updated. The count is updated for every matching transaction.

At step 830, a get operation is performed for historical transaction data, which includes name information, email address information, shipping address information, and IP address information. If name information, email address information, shipping address information, and IP address information from the original transaction match historical data, then the count for that row will be updated.

At step 840, a get operation is performed for historical transaction data, which includes name information, email address information, shipping address information, credit card information, and IP address information. If name information, email address information, shipping address information, credit card information, and IP address information from the original transaction match historical data, the count for that row will be updated.

At step 850, a get operation is performed for historical transaction data, which includes name information, shipping address information, and credit card information. If name information, shipping address information, and credit card information from the original data match historical data, then the count for that row will be updated.

At step 860, a get operation is performed for historical transaction data, which includes name information, billing address information, credit card information, and IP address information. If the name information, billing address information, credit card information, and IP address information from the original data match historical data, then the count for that row will be updated.

At step 870, a get operation is performed for historical transaction data, which includes name information, billing address information, credit card information, and device fingerprint information. If the name information, billing address information, credit card information, and device fingerprint information from the original data match historical data, then the count for that row will be updated.

At step 880, a get operation is performed for historical transaction data, which includes name information, email address information, billing address information, and IP address information. If the name information, email address information, billing address information, and IP address information from the original transaction match history data, then the count for that row will be updated.

At step 890, a get operation is performed for historical transaction data, which includes name information, email address information, billing address information, and device fingerprint information. If the name information, email address information, billing address information, and device fingerprint information from the original transaction match history data, then the count for that row will be updated.

At step 891, a get operation is performed for historical transaction data, which includes email address information and shipping address information. If the email address information and shipping address information from the original transaction match history data, then the count for that row will be updated.

The queries can be sent to all resource providers associated with the request processing system or the queries can be sent to particular resource providers which are known to have particular information. Therefore, queries are sent in an efficient manner to resource provider systems. For example, resource providers that are known to have name information, email address information, shipping address information, and credit card information will be sent a query for such information instead of sending a query for all possible types of information.

These are examples of get operations. Example embodiments can include fewer or more get operations based on the number of types of information that can be obtained or the desired level of accuracy. Further, the order of the get operations can vary. The reviewer computer can aggregate the results of the get operations in order to generate a consolidated view.

FIG. 9 is an example of pseudocode 900 for performing the get commands, in accordance with some example embodiments.

The pseudo code 900 can include commands for obtaining name information, email information, credit card information, billing address information, shipping address information, device fingerprint information, and IP address information associated with the customer making the transaction and the device being used by the customer.

The pseudocode 900 describes a process of obtaining data from a transaction history that matches a given transaction. An example method can identify transactions that have a match with any of the fields from a given transaction. Matching fields can include e-mail address filed, IP address field, credit card field, etc. After matching fields are obtained, a map of matched combinations from history can be created. If an exact match in found in the history for billing address, shipping address, email, phone and credit card, then there is a high likelihood that current transaction is a valid transaction. However, if there are no matches with any of the combinations and all of the fields are found in different transactions, then there is a high likelihood that the transaction is fraudulent.

III. Consolidated Views

After all of the queries have been performed, the history API will generate a consolidated view shown in FIGS. 10A and 11A. FIG. 10A illustrates a consolidated view 1000 of an accepted transaction, in accordance with some example embodiments.

The combination of FIG. 10A and FIG. 10B can also be called a consolidated view or a combined consolidated view. The combination of FIG. 10A and FIG. 10B can be presented on a user interface at a same time. For example, FIG. 10A can be displayed next to FIG. 10B. Therefore, all of the information needed to make a decision can be displayed on a single display as a consolidated view.

As shown in FIG. 10A, information that is used to decide whether or not to accept or decline the transaction can include name information 1001, email address information 1002, billing address information 1003, shipping address information 1004, credit card information 1005, device, fingerprint information 1006, and IP address information 1007. These are merely examples and alternative or additional data may be used. For example, data specific to particular resource providers may be used to determine matches in transaction information. The consolidated view can also indicate how far back the data matches ("earliest date") and can indicate a date of the most recent match ("latest date").

The consolidated views can also include links which are selectable by the reviewer. By selecting specific links, the reviewer can be directed to associated information. For example, in FIG. 10A, if the reviewer were to select the name column, the reviewer can be directed to a page including a historical transaction in which the name in the original transaction matches a name in the historical transaction. A user can easily verify the source of the information used in generating the consolidated view by selecting on the different columns of information provided in the consolidated view.

The consolidated view can also indicate a score. The score can be calculated based on the verified user information and the matching user transaction history information. If the score is above a predetermined threshold score, the reviewer computer can notify the resource provider to accept the transaction. If the score is below the predetermined threshold score, the reviewer computer can send a notification to the resource provider to decline the transaction. The predetermined threshold score can be determined by the reviewer computer. The predetermined threshold score can be a score that has been determined to be associated with an acceptable transaction.

A reviewer may only need to look at the score in order to determine whether or not the transaction should be authorized and the user may not need to review all of the information in the consolidated view. The reviewer computer can independently make a determination based on the generated score. Therefore, a reviewer may not be needed in making a determination as to whether the transaction should be accepted or declined since the reviewer computer can independently make that determination.

FIG. 11A illustrates a consolidated view 1100 of a rejected transaction, in accordance with some example embodiments. The combination of FIG. 11A and FIG. 11B can also be called a consolidated view or a combined consolidated view. That is, the combination of FIG. 11A and FIG. 11B can be presented on a user interface at a same time. For example, FIG. 11A can be displayed next to FIG. 11B. Therefore, all of the information needed to make a decision can be displayed on a single display as a consolidated view.

The consolidated view 1100 shown in FIG. 11A, is for a rejected transaction since there is insufficient data to indicate that the transaction is an authorized transaction. If, for example, there is an email address and email address was created one day ago and the email address has only been used for the current case that is being reviewed, this can indicate that the email address is a risky email address and it is not likely that the customer is a valid customer or that the transaction should be authorized.

Further, is there are no matches between data in the original transaction and historical transaction data, then the reviewer computer can determine that the transaction should be declined. If there is no history data or no matching data in the consolidated view, then the transaction can be flagged for rejection.

The consolidated views can be stored by the reviewer computer. Alternatively, the consolidated views can be removed from the request processing system when a determination is made regarding the case.

If there is a sufficient amount of information available, the reviewer computer can make all determinations without user intervention. Further, the reviewer computer can aggregate decisions made by a reviewer. The reviewer computer can also learn from the decisions made by the reviewer, and can independently make determinations for future cases.

After the reviewer computer user makes a decision regarding the transaction, the consolidated information can be deleted so as to save memory resources. Alternatively, the aggregated data can be stored for a predetermined period of time. For example, the aggregated data can be stored for a predetermined period of time that is determined by the reviewer computer system, or based on a default period of time for storing data.

IV. Computer System

Figure 12:
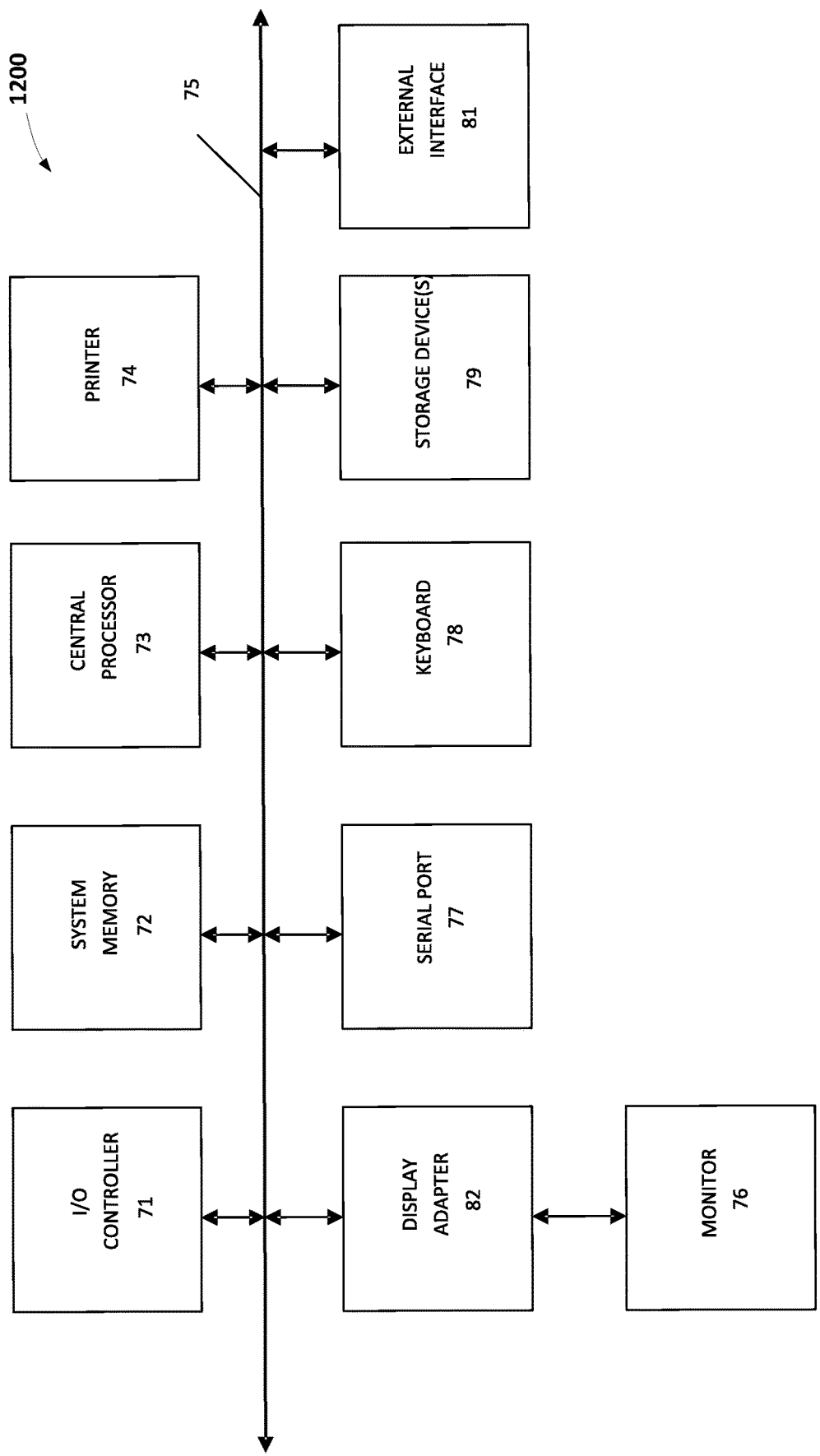
FIG. 12 illustrates a block diagram of a computer apparatus, in accordance with some example embodiments.

FIG. 12 is a high level block diagram of a computer system 1400 that may be used to implement any of the entities or components described above. The computer system 1400 can be included in a request processing system.

The subsystems shown in FIG. 12 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

It should be understood that any of the embodiments can be implemented in the form of control logic using hardware (e.g., an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the disclosure. However, other embodiments may be directed to specific embodiments relating to each individual aspect, or specific combinations of these individual aspects.

For the purposes of explanation, specific details are set forth in order to provide a thorough understanding of the exemplary embodiments. However, it will be apparent that various embodiments may be practiced without these specific details. For example, circuits, systems, algorithms, structures, techniques, networks, processes, and other components may be shown as components in block diagram form in order not to obscure the embodiments in unnecessary detail.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method for review of user transaction information, the method comprising:
   receiving, by a server computer of a request processing system from a resource provider computer, an authorization request including transaction information of a transaction between a user device and the resource provider computer, wherein the server computer comprises a first processor and a first memory, and wherein the resource provider computer comprises a second processor and a second memory;
   identifying, by the server computer, the transaction for review based on preconfigured rules set by the resource provider computer;
   sending, by the server computer, the transaction information to a reviewer computer of the request processing system;
   receiving, by the reviewer computer, the transaction information, wherein the transaction information comprises user information and a transaction key associated with the resource provider computer;
   determining, by the reviewer computer, whether the resource provider computer is enrolled in a user verification system based on the transaction key associated with the resource provider computer;
   determining, by the reviewer computer, one or more server systems for obtaining user verification information, wherein the user verification information is used to verify an identity of a user;
   obtaining the user verification information from the determined one or more server systems;
   verifying, by the reviewer computer, validity of the user information based on the user verification information obtained from the one or more server systems;
   accessing, by the reviewer computer, user transaction history information associated with the user information from a history database, wherein the user transaction history information comprises historical user transactions;
   determining whether current user information in the transaction information matches historical user information in the historical user transactions, thereby generating matching historical user information;
   generating, by the reviewer computer, a consolidated view comprising the verified user information of the transaction information and the matching user information in the historical user transactions;
   learning, by the reviewer computer, from a history of transactions that were authorized; and
   determining, by the reviewer computer, to authorize the transaction based on the learning.

2. The method according to claim 1, further comprising:
   evaluating, by the reviewer computer, the verified user information and the matching user information used to generate the consolidated view; and
   determining, by the reviewer computer, whether to accept or decline the transaction based on the verified user information and the matching user information used to generate the consolidated view.

3. The method according to claim 2, wherein the determining whether user information in the transaction matches user information in the historical user transactions comprises:
   sending, by the reviewer computer, a first query to the history database storing user transaction history information, wherein the first query comprises a first combination of fields of the user information; and
   receiving, by the reviewer computer, one or more historical user transactions associated with the first combination of fields of the user information.

4. The method according to claim 1, wherein the user information includes one or more different fields of user identification information, and wherein the user information comprises at least three of: a name of the user of the user device, an e-mail address of the user, an address of the user, an address associated with the transaction, account information of the user, device fingerprint information of the user device, and an IP address of the user device.

5. The method according to claim 4, further comprising incrementing a count value for a first combination of user identification information for each transaction of the historical user transactions having the first combination of user identification information.

6. The method according to claim 1, wherein the consolidated view is generated automatically by the reviewer computer in response to receiving a request for the consolidated view, wherein the request comprises selection of a marker on a user interface of the reviewer computer.

7. The method according to claim 1, wherein the one or more server systems are external to the request processing system.

8. The method according to claim 1, further comprising:
   calculating a score for the transaction based on the verified user information and the matching user information;
   in response to the score being above a predetermined threshold score, notifying the resource provider computer to accept the transaction; and
   in response to the score being below the predetermined threshold score, notifying the resource provider computer to decline the transaction.

9. The method according to claim 1, wherein the validity of the user information is verified based on a predetermined one or more of email information, billing address information, shipping address information, phone number information, and device IP address information from the user information associated with the transaction matching the email information, the billing address information, the shipping address information, the phone number information, and the device IP address information from the one or more server systems.

10. A reviewer computer comprising:
a processor and a memory;
a computer readable medium coupled to the processor, the computer readable medium storing instructions executable by the processor for implementing a method comprising:
receiving, by the reviewer computer, transaction information, wherein the transaction information comprises user information and a transaction key associated with a resource provider computer, and wherein the resource provider computer comprises a second processor and a second memory;
determining, by the reviewer computer, whether the resource provider computer is enrolled in a user verification system based on the transaction key associated with the resource provider computer;
determining, by the reviewer computer, one or more server systems for obtaining user verification information, wherein the user verification information is used to verify an identity of a user;
obtaining the user verification information from the determined one or more server systems;
verifying, by the reviewer computer, validity of the user information based on the user verification information obtained from the one or more server systems;
accessing, by the reviewer computer, user transaction history information associated with the user information from a history database, wherein the user transaction history information comprises historical user transactions;
determining whether current user information in the transaction information matches historical user information in the historical user transactions, thereby generating matching historical user information;
generating, by the reviewer computer, a consolidated view comprising the verified user information of the transaction information and the matching user information in the historical user transactions;
learning, by the reviewer computer, from a history of transactions that were authorized; and
determining, by the reviewer computer, to authorize a transaction based on the learning.

11. The reviewer computer according to claim 10, the method further comprising:
evaluating, by the reviewer computer, the verified user information and the matching user information used to generate the consolidated view; and
determining, by the reviewer computer, whether to accept or decline the transaction based on the verified user information and the matching user information used to generate the consolidated view.

12. The reviewer computer according to claim 11, wherein the determining whether user information in the transaction matches user information in the historical user transactions comprises:
sending, by the reviewer computer, a first query to the history database storing user transaction history information, wherein the first query comprises a first combination of fields of user identification information; and
receiving, by the reviewer computer, one or more historical user transactions associated with the first combination of fields of user identification information.

13. The reviewer computer according to claim 10, wherein the user information includes one or more different fields of user identification information, and wherein the user information comprises at least three of: a name of the user of a user device, an e-mail address of the user, an address of the user, an address associated with the transaction, account information of the user, device fingerprint information of the user device, and an IP address of the user device.

14. The reviewer computer according to claim 13, further comprising incrementing a count value for a first combination of user identification information for each transaction of the historical user transactions having the first combination of user identification information.

15. The reviewer computer according to claim 10, wherein the consolidated view is generated automatically by the reviewer computer in response to receiving a request for the consolidated view, wherein the request comprises selection of a marker on a user interface of the reviewer computer.

16. The reviewer computer according to claim 10, further comprising:
calculating a score for the transaction based on the verified user information and the matching user information;
in response to the score being above a predetermined threshold score, notifying the resource provider computer to accept the transaction; and
in response to the score being below the predetermined threshold score, notifying the resource provider computer to decline the transaction.

17. The reviewer computer according to claim 10, wherein the validity of the user information is verified based on a predetermined one or more of email information, billing address information, shipping address information, phone number information, and device IP address information from the user information associated with a transaction matching the email information, the billing address information, the shipping address information, the phone number information, and the device IP address information from the one or more server systems.

18. A system for review of user transaction information, the system comprising:
a server computer, comprising a processor and a memory, configured to:
receive a request processing system from a resource provider computer, an authorization request including transaction information of a transaction between a user device and the resource provider computer, and wherein the resource provider computer comprises a second processor and a second memory;
identify the transaction for review based on preconfigured rules set by the resource provider computer;
send the transaction information to a reviewer computer of the request processing system;
the reviewer computer, comprising a processor and a memory, configured to:
receive the transaction information, wherein the transaction information comprises user information and a transaction key associated with the resource provider computer;

determine whether the resource provider computer is enrolled in a user verification system based on the transaction key associated with the resource provider computer;

determine one or more server systems for obtaining user verification information, wherein the user verification information is used to verify an identity of a user;

obtain the user verification information from the determined one or more server systems;

verify validity of the user information based on the user verification information obtained from the one or more server systems;

access user transaction history information associated with the user information from a history database, wherein the user transaction history information comprises historical user transactions;

determine whether current user information in the transaction information matches historical user information in the historical user transactions, thereby generating matching user information;

generate a consolidated view comprising the verified user information of the transaction information and the matching user information in the historical user transactions;

learning, by the reviewer computer, from a history of transactions that were authorized; and determining, by the reviewer computer, to authorize the transaction based on the learning.

* * * * *